(12) United States Patent
Dennis

(10) Patent No.: US 10,598,291 B2
(45) Date of Patent: Mar. 24, 2020

(54) GUIDED CHECK VALVE

(71) Applicant: Fluid Power, Inc., Blue Bell, PA (US)

(72) Inventor: Phil Dennis, Perkasie, PA (US)

(73) Assignee: Fluid Power, Inc., Blue Bell, PA (US)

( * ) Notice: Subject to any disclaimer, the term of this patent is extended or adjusted under 35 U.S.C. 154(b) by 0 days.

(21) Appl. No.: 15/093,569

(22) Filed: Apr. 7, 2016

(65) Prior Publication Data

US 2017/0292620 A1  Oct. 12, 2017

(51) Int. Cl.
*F16K 15/02* (2006.01)
*F16K 27/02* (2006.01)

(52) U.S. Cl.
CPC ........ *F16K 15/028* (2013.01); *F16K 27/0209* (2013.01)

(58) Field of Classification Search
CPC .... F16K 15/063; F16K 15/023; F16K 15/038; F16K 15/026; F16K 15/06
USPC ........................................ 137/543.21, 543.27
See application file for complete search history.

(56) References Cited

U.S. PATENT DOCUMENTS

| | | | | |
|---|---|---|---|---|
| 259,109 A * | 6/1882 | Duchemin | ............ | F16K 15/063 109/27 |
| 2,356,360 A * | 8/1944 | Smolensky | ........... | F16K 15/063 137/533.31 |
| 3,763,882 A * | 10/1973 | Shoop | ................... | F16K 15/026 137/494 |
| 3,830,255 A * | 8/1974 | Freiheit | ............... | F04B 53/1007 137/539 |
| 4,766,930 A * | 8/1988 | Patti | ...................... | F16K 15/026 137/540 |
| 2007/0044848 A1 * | 3/2007 | Norman | ................ | F16K 15/063 137/542 |

OTHER PUBLICATIONS

Search report in PCT/US2017/026215.

* cited by examiner

*Primary Examiner* — P. Macade Nichols
(74) *Attorney, Agent, or Firm* — Muskin and Farmer LLC

(57) ABSTRACT

A spring-driven guided check valve which eliminates fluttering of the disc as it moves between the open and closed position against a seat. A disc has an integrated guide which slides against a sleeve inside the body of the valve. This configuration only allows linear movement of the seat in a direction towards (and away) from an inlet face without changing the orientation of the disc. The disc is held in a constant orientation and thus cannot shift at an inclined attitude (flutter). Thus, once the valve closes and the disc makes contact with the seat, the entire disc would contact the entire seat at the same point in time because of the parallel orientation of the disc to the contacting surface of the seat.

13 Claims, 12 Drawing Sheets

GUIDED CHECK VALVE

BACKGROUND OF THE INVENTION

Field of the Invention

The present general inventive concept is directed to a method and apparatus, and directed to a guided check valve.

Description of the Related Art

Spring operated check valves which can be used in high pressure hydraulic systems and in other applications are known in the art. FIG. 1 is drawing of a prior art thread-in disc type check valve.

In typical operation, this valve allows flow in one direction, while it prevents flow in the opposite direction. The valve shown in FIG. 1 consists of a valve body 101, valve disc 102, valve seat 103, and spring 100. Aperture 111 leads to a spring chamber 104. Outlet face 110 is the face of the valve on the outlet side (the side of the valve fluid flows out of). Nine holes are shown in the outlet face 110 through which the fluid flows. Inlet face 115 is the face of the valve on the inlet side (fluid flows into the inlet face side when the valve is open, through the valve and out the outlet face side).

In the absence of any fluid pressure, the valve disc 102 is urged in the closed position against the valve seat 103 by the spring 100. The mating surfaces of both the disc 102 and the seat 103 are flat lapped in order to provide a metal on metal seal.

FIG. 2 is a drawing of a cross section of the thread-in disc type check valve in the closed position. In this position, flow through the valve in the reverse direction, from leftward (the outlet face 110) to rightward (the inlet face 115), is prevented. In actual use, the forward face of the seat of the valve is typically provided with an O-ring to prevent any helical leakage around the threads from bypassing the seat/disc interface. One of the holes 112 is shown which allows fluid to pass through. Note that in the closed position, fluid cannot pass through the entire check valve in either direction, as the seal between the seat 103 and the disc 102 does not allow pass-through (and there is no other pass in the valve to allow such flow).

FIG. 3 is a drawing of a cross section of the thread-in disc type check valve in the open position. This occurs when the pressurized fluid, acting over the exposed face of the disc 102, creates a force sufficient to overcome the opposite closing force of the spring. Once the disc is lifted off of the seat, a flow path exists through the valve, from right to left. Fluid can flow out of the hole 112, which is one of many such holes (see FIG. 1).

"Disc flutter" is one disadvantage of this type of valve that can occur in certain flow conditions. The unguided disc is vulnerable to rapid motion, or fluttering, in the face of a turbulent flow through the valve, with the valve in a partially opened position. This can occur if the entrance to the valve is immediately downstream of a sudden change in fluid direction, such as after an elbow. This fluttering will cause the hardened disc to strike the valve body and seat at an inclined attitude (reflected in FIG. 4), resulting in very high local stresses, plastic deformation, and wear. Note how the disc 102 is at an angle. Also, frequent valve opening and closing in the face of a non-axial fluid flow, again, for example, caused by placement after an elbow or the like, and at nominal flows near or at the flow rating of the valve, can cause angular impingement of the disc against the body (as the valve is opening), and the seat (as the valve is closing). This again results in very high local stresses at the initial contact point, with resulting plastic deformation and wear.

The end result is that a disc type check valve operating under conditions conducive to valve disc flutter may experience accelerated wear, and its disc-seat interface may become incompetent in very short order. Disc chatter is another disadvantage of the disc type valve, where, when, at very low flow rates, it 'chatters' or rapidly opens and closes. This can cause rapid wear of the seat.

What is needed is a disc type check valve that overcomes, reduces or eliminates this disc flutter and chatter.

SUMMARY OF THE INVENTION

It is an aspect of the present invention to provide an improved valve.

These together with other aspects and advantages which will be subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

Further features and advantages of the present invention, as well as the structure and operation of various embodiments of the present invention, will become apparent and more readily appreciated from the following description of the preferred embodiments, taken in conjunction with the accompanying drawings of which.

DESCRIPTION OF THE PREFERRED EMBODIMENTS

Figure 1:
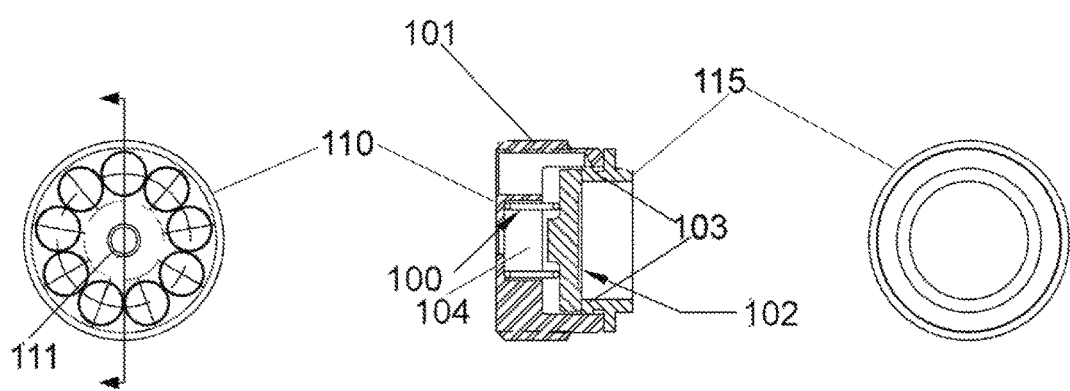
FIG. 1 is drawing of a prior art thread-in disc type check valve.

Reference will now be made in detail to the presently preferred embodiments of the invention, examples of which are illustrated in the accompanying drawings, wherein like reference numerals refer to like elements throughout.

The general inventive concept relates to a disc type check valve (enabling fluid to flow in only one direction but not the reverse direction) which reduces or eliminates the disc flutter problem described above. The check valve described herein can be used in hydraulic power systems although it can also be used as a check valve in any other system as well, such as a gas driven system. The check valve may be preferred for use in hydraulic systems operating in flow environments that are conducive to valve disc flutter and/or applications where the inlet flow is non-axial. However, the check valve would operate in any environment.

Note that fluid as used herein refers to any type of hydraulic fluid typically used in the art, including a fluid based on any kind of oil, mineral oil, water, water glycol, and any commercially available hydraulic fluid such as SKYDROL, etc.

Figure 5:
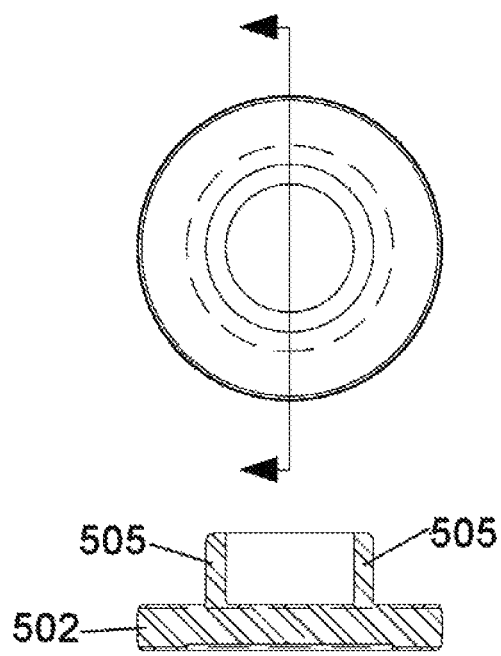
FIG. 5 is a drawing of a valve disc with a guide used in a check valve, according to an embodiment.

FIG. 5 is a drawing of a valve disc with a guide used in a check valve, according to an embodiment.

A disc 502 has a raised annulus on the posterior surface of the disc 502 which is referred to as a guide 505. The guide 505 is integrally part of the disc 502 (manufactured as the same piece), although in another embodiment the guide 505 can be manufactured as a separate component and attached to the disc 502.

Figure 2:
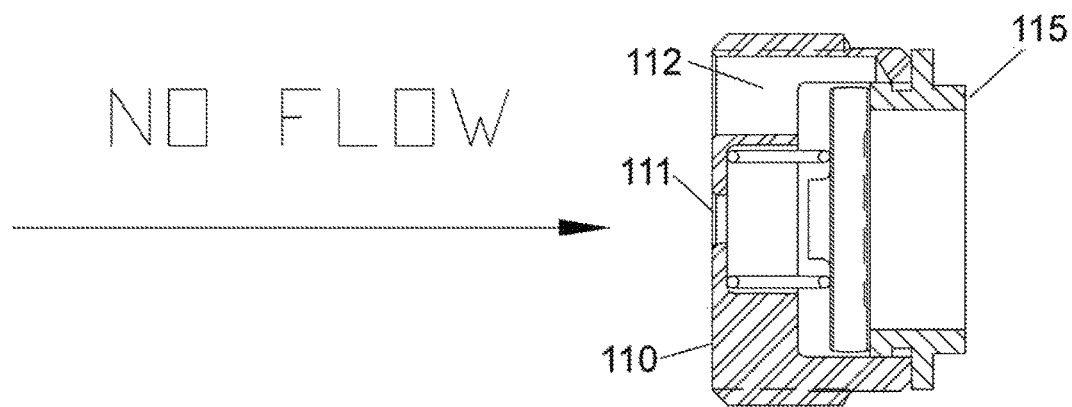
FIG. 2 is a drawing of a cross section of the thread-in disc type check valve in the closed position.
Figure 3:
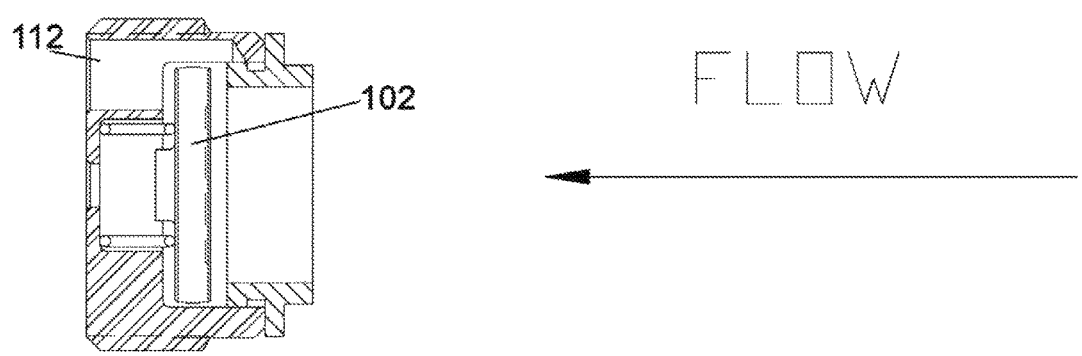
FIG. 3 is a drawing of a cross section of the thread-in disc type check valve in the open position.
Figure 6:
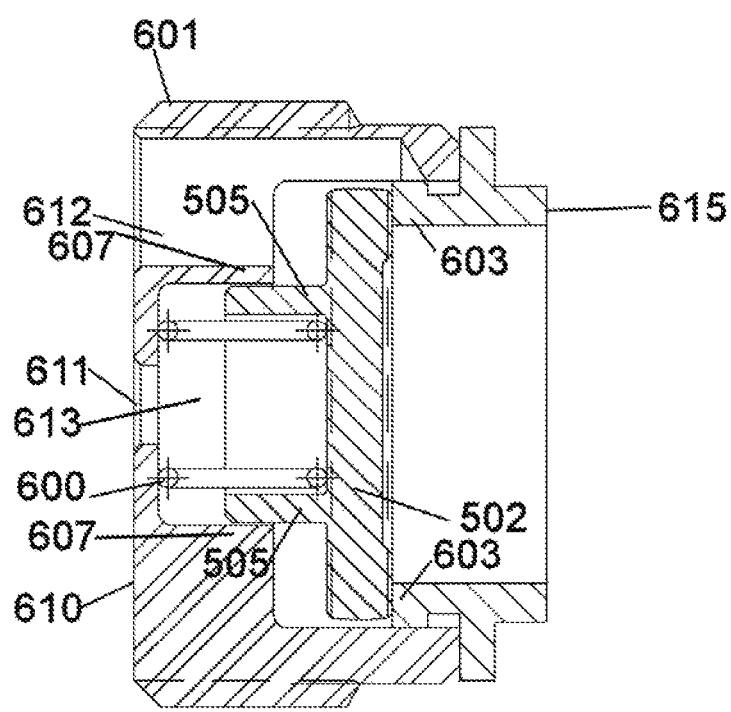
FIG. 6 is a drawing of a cross section of the check valve utilizing the disc with a guide, according to an embodiment.

FIG. 6 is a drawing of a cross section of the check valve utilizing the disc with a guide, according to an embodiment. The check valve operates in the manner as illustrated in FIGS. 1-3 but utilizes the disc 502 with its guide 505. The disc 502 will make a tight seal with a seat 603 in the closed position. The check valve has a body 601, hole 612 (out of a set of holes for fluid flow as illustrated in FIG. 1), and an aperture 611 into a control chamber 613. A spring 600 is located between the body 601 and the disc 502 and the guide 505, and is guided by the inside diameter of the guide 505. The spring 600 will naturally push the disc 502 against the seat 603 forming the tight seal, which can open upon sufficient opposite pressure on the disc 502 from fluid flowing from the inlet face 615 towards the outlet face 610. Of course fluid flowing from the outlet face 610 towards the inlet face 615 will exert pressure on the disc 502 (along with the spring 600) to maintain the closed state (tight seal between the disc 502 and the seat 603) thereby preventing fluid from flowing in the opposite direction.

Outlet face 610 is the face which the fluid flows out through (when the valve is in the open position and fluid is flowing through the valve). Inlet face 615 is the face of the valve on the inlet side (fluid flows into the inlet face side, through the valve and out the outlet face side).

Figure 4:
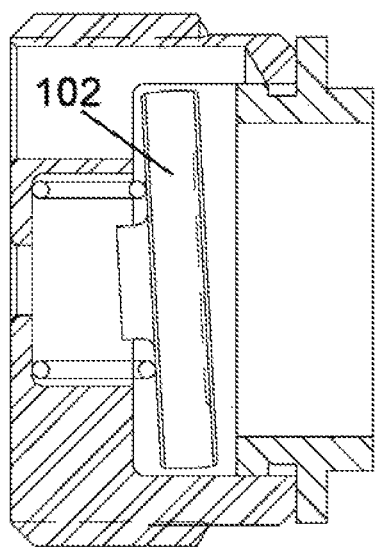
FIG. 4 is a drawing of a cross section of the thread-in disc type check valve undergoing fluttering or angular opening.

A portion of the outside diameter of the guide 505 is in opposition to a corresponding inside diameter of a sleeve 607 on the valve body 601. This prevents the disc 502 from cocking or fluttering in the valve, and allows only axial movement. In other words, the motion of the disc is straight (or linear) in that the disc 502 does not change its orientation but simply moves along one axis (vector) either forward (closes) or backward (opens). The disc 502 maintains constant orientation throughout its motion. In the closed position, the disc 502 meets the seat 603 uniformly. In other words, the entire disc 502 would contact the seat 603 all at one time and not partially (as in the "flutter" condition illustrated in FIG. 4). The surface of the disc 502 which touches the seat 603 remains parallel to a surface of the seat 603 which contacts the disc 502 during motion of the disc 502.

Figure 7:
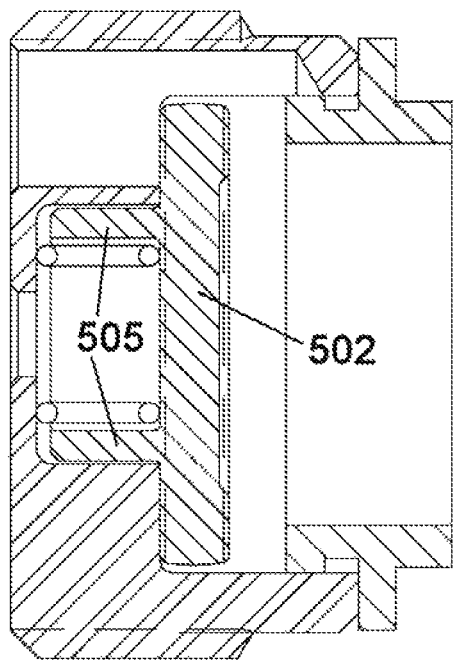
FIG. 7 is a drawing of a cross section of the check valve in the open position, according to an embodiment.

FIG. 7 is a drawing of a cross section of the check valve in the open position, according to an embodiment.

When opening, remaining open, or closing, the sleeve 607 limits the motion of the guide 505, thereby only allowing axial motion of the disc 502. The disc 502 therefore will not impact either the seat 603 when closing, or the body 601 when opening, in an inclined attitude. The area of contact is increased, and localized stresses are reduced as are the rates of wear. When contact occurs between the disc 502 and the seat 603 (in the closed position), the contact is uniform around both the seat 603 and the disc 502 therefore causing uniform wear. Thus, one benefit of the check valve described herein is that it may reduce wear over the prior art check valve. Another benefit of the check valve described herein is the possibility to dampen valve opening and closing.

Figure 8:
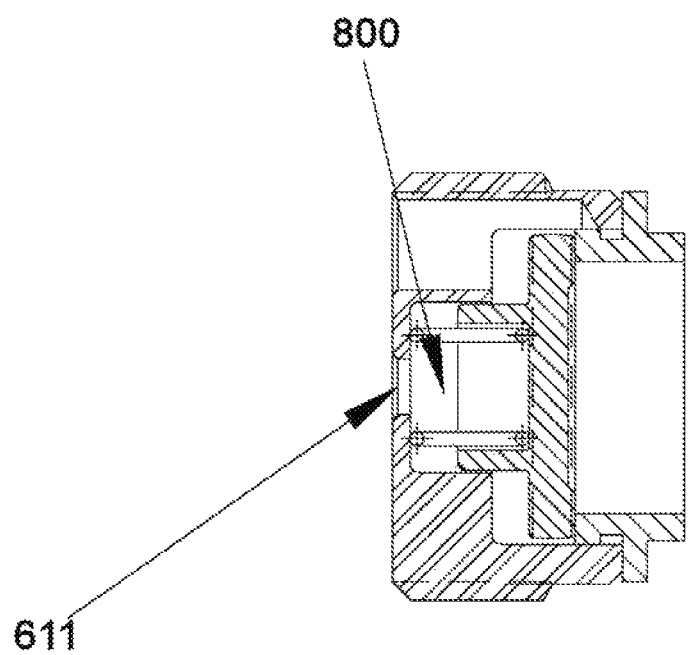
FIG. 8 is a drawing of a cross section of the check valve in the closed position, according to an embodiment.

FIG. 8 is a drawing of a cross section of the check valve in the closed position, according to an embodiment.

Note the volume of the control chamber 800. The control chamber 800 would typically be filled with the medium passing through the valve, for example, hydraulic fluid. A volume equivalent to the difference between the control chamber 800 with the valve in the open and closed positions needs to be evacuated from the control chamber 800 when the valve is open. Conversely, the same volume must be added back to the chamber when the valve moves from the open to the closed position. In another embodiment, the fluid in the control chamber 800 is in communication with the fluid exiting the valve. This fluid is discharged into, and sourced from, the fluid at the exit of the valve. However, the pressure inside the control chamber 800 can be different than the pressure of the fluid flowing through the valve. For example, fluid pressure acting on the forward face of the disc is opposed by the spring, and the pressure of the fluid inside of the chamber acts on the forward area inside the guide. When the valve is opening (particularly rapidly) this pressure can be high. When closing, the pressure will tend to be lower than the pressure on the inlet side of the aperture. Utilizing fluid inside the control chamber 800 is required for proper operation of the valve.

Figure 9:
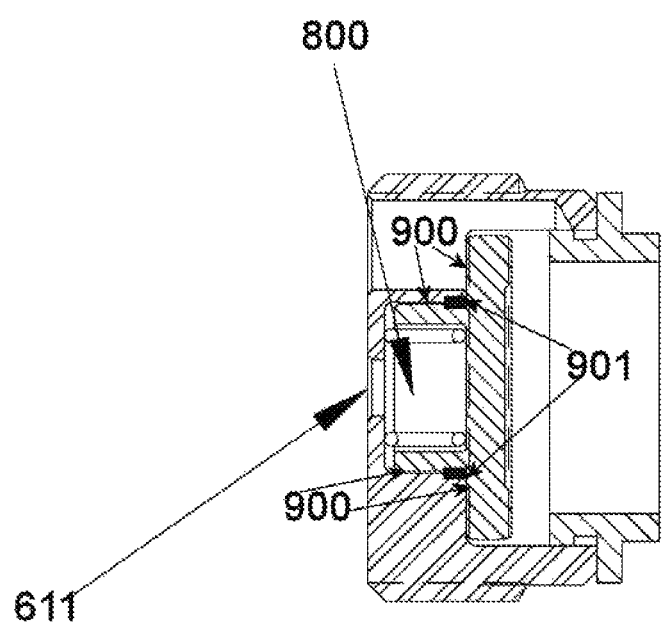
FIG. 9 is a drawing of a cross section of the check valve in the open position, according to an embodiment.

FIG. 9 is a drawing of a cross section of the check valve in the open position, according to an embodiment.

Note that the volume of the control chamber 800 in the closed position is larger than the volume of the control chamber 800 when the valve is in the open position (see FIG. 8).

By varying the size of aperture 611, the rate of emptying or filling the control chamber 800 may be varied, and thus the rate of valve opening and closing can be controlled. The clearance between the outer diameter of the guide 505 and the inner diameter of the sleeve 607 is a leakage path 900 (typically very narrow compared to the aperture 611) where fluid can leak between the inlet side and the control chamber 800. An optional seal 901 can be placed between the outer diameter of the guide 505 and the inner diameter of the sleeve 607 to eliminate the leakage path 900. Therefore, by controlling the maximum disc velocity of the disc 502, the energy of impact may be limited. This also reduces the rate of wear. Certain applications may benefit from slower rates of opening and closing, and thus may find the check valve described herein advantageous. The control chamber 800, through its dashpot action, also tends to reduce or eliminate valve chatter (the rapid opening and closing of the valve at very low flows with the valve barely open).

The improved rate of wear offered by the valve described herein offers the possibility to make disc type check valves out of different, softer materials. There are certain applications where it is desirable to employ a valve made out of stainless steel (corrosive fluids are but one example). The typical hardness employed in valve discs and seats of the prior art precluded the meaningful use of stainless steel materials, due to the relative softness of the stainless steels, and the resultant limited lifespan. Valves utilizing the inventive concepts described herein can be made from stainless steel and may have reduced wear over prior art check valves.

Figure 10A:
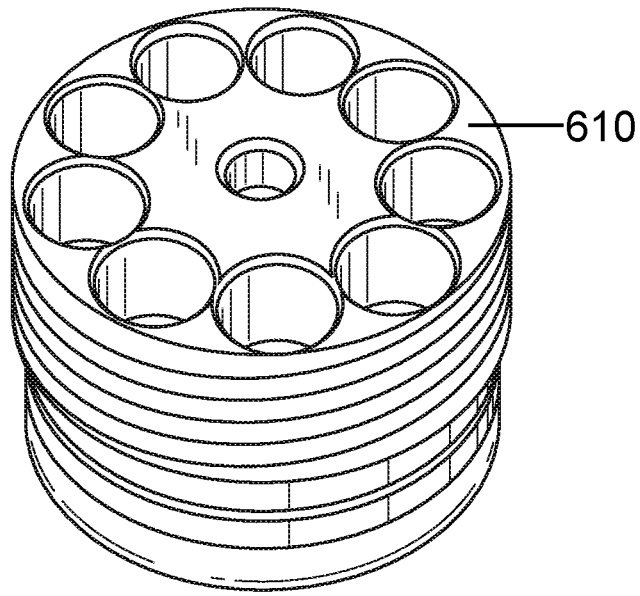
FIG. 10A is a perspective drawing of an external view of the outlet face of the check valve, according to an embodiment.

FIG. 10A is a perspective drawing of an external view of the outlet face of the check valve, according to an embodiment. The outlet face 610 is shown with the set of nine holes (although of course other numbers of holes can be used). In the center of the set of holes is the aperture 611.

Figure 10B:
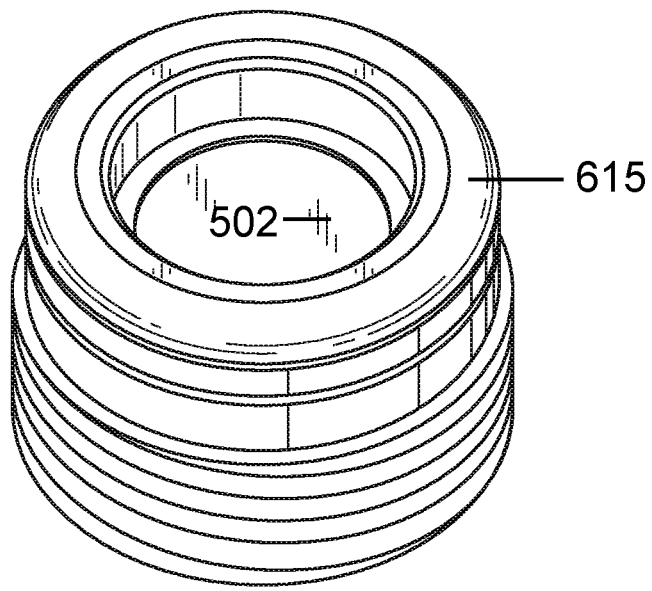
FIG. 10B is a perspective drawing of an external view of the inlet face of the check valve, according to an embodiment.

FIG. 10B is a perspective drawing of an external view of the inlet face of the check valve, according to an embodiment. During flow operation of the valve, the fluid flows into the inlet face 615, through the valve and out the outlet face 610. The disc 502 is shown (note that the side of the disc 502 shown is an opposite side of the disc than the side of the disc which the spring 600 contacts). Note how the sides illustrated in FIGS. 10A, 10B are threaded allowing for easy installation of the valve.

Figure 11:
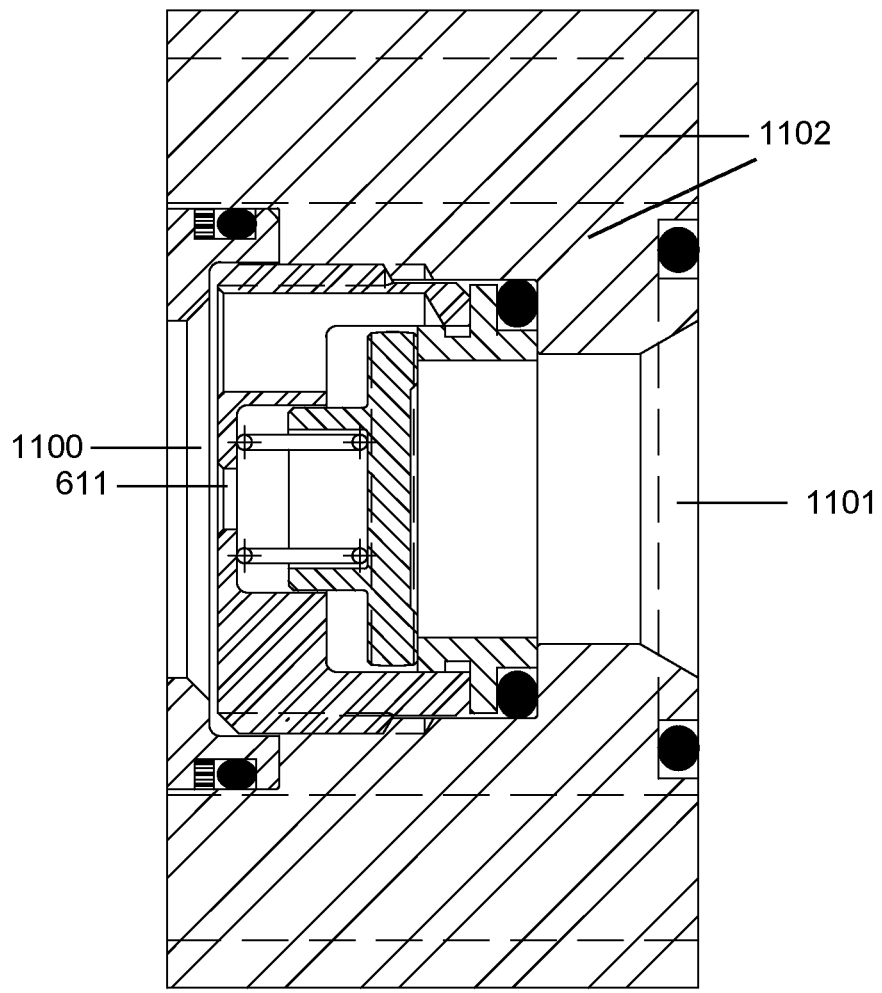
FIG. 11 is a drawing of the check valve in a body, according to an embodiment.

FIG. 11 is a drawing of the check valve in a body, according to an embodiment. The check valve can be inserted inside a body 1102 and can be used as part of a larger hydraulic system. Note the black ovals in FIG. 11 are seals (seals can be made out of rubber, silicone, or any other suitable material). Fluid flows from an inlet path 1101 through the check valve and out an outlet path 1100. Note that fluid in the outlet path 1100 can pass through the aperture 611 into the control chamber (and vice-versa).

Note that fluid as used herein can refer to any type of hydraulic fluid typically used in the art, including a fluid based on any kind of oil, mineral oil, water, and any commercially available hydraulic fluid such as SKYDROL, etc., although any other fluid can be used as well.

Figure 12:
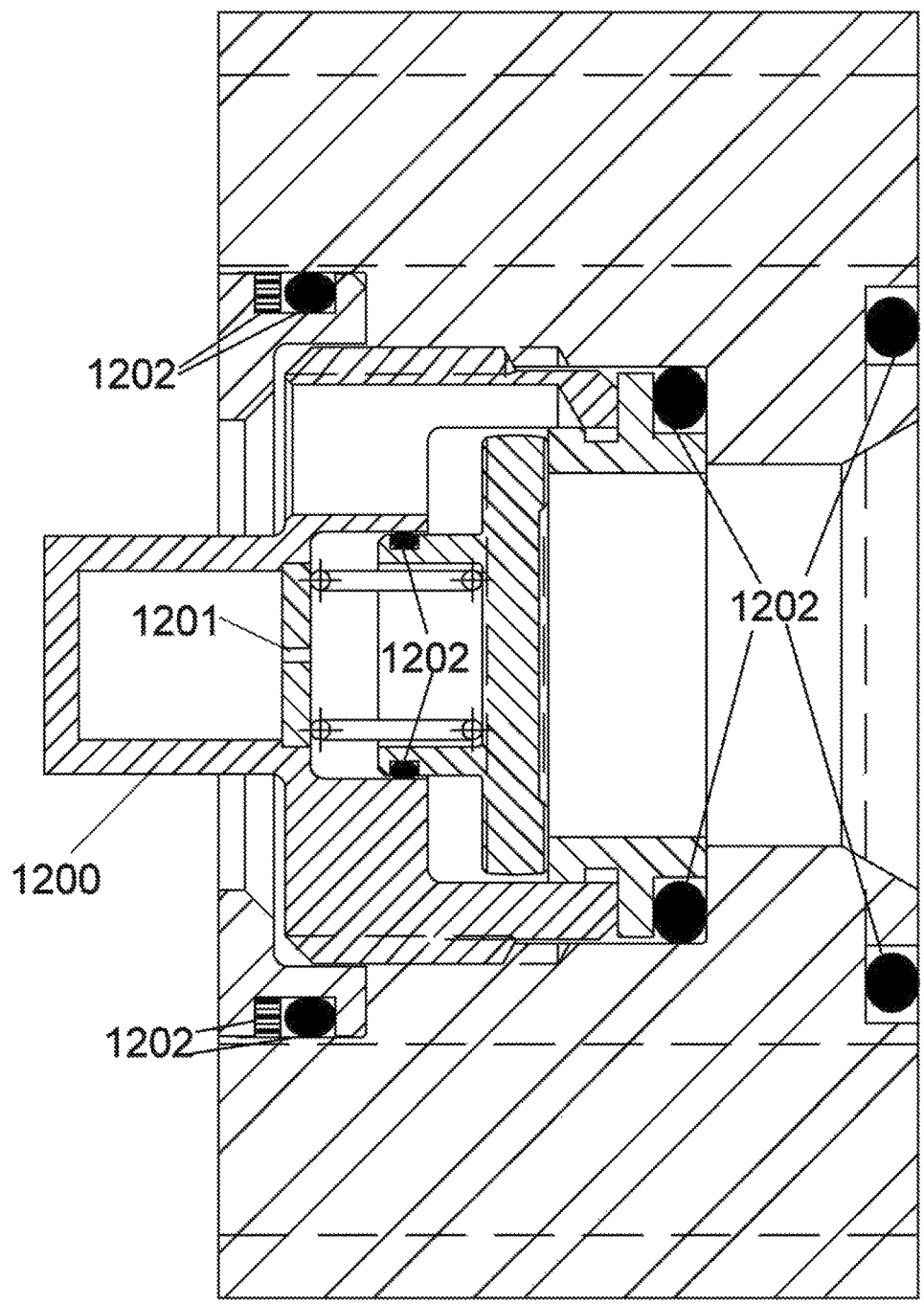
FIG. 12 is a drawing of the check valve in a body with an enclosed chamber at the outlet of the valve, according to an embodiment.

FIG. 12 is a drawing of the check valve in a body with an enclosed chamber at the outlet of the valve, according to an embodiment.

In one embodiment, the fluid in the control chamber 800 is separately contained from the fluid passing through the valve (e.g., which passes through the opening between the disc 502 and seat 603) and is under its own internal pressure (thus fluid in the control chamber 800 is separate and does not pass in or out of the valve in the manner that the fluid flowing through the valve does).

This can be accomplished by an enclosed chamber (or "can") 1200 is continuous with the valve body and an orifice 1201 in which matter can pass between the control chamber and the enclosed chamber 1200. This embodiment can provide both damping action (if the orifice 1201 is small enough), plus additional spring force. In this embodiment, the "fluid" in the enclosed chamber 1200 should be compressible (gas). As such, its pressure will be influenced by temperature. Also shown are seals 1201 (which are all also present in FIG. 11).

The valve and all parts (with the exception of the spring and seals) should typically be made using hardened steel or other hard material.

All features described and/or illustrated herein (or the absence of any such feature) can be combined with each other in any combination without limitation. Any combination of feature(s) can be used without limitation with any other combination of feature(s). The illustrations shown herein are exemplary but any illustration can be augmented with any feature described herein or any feature shown can also be removed without limitation.

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What is claimed is:

1. A valve assembly, comprising:
    a seat;
    a sleeve;
    a disc comprising a guide, the guide positioned inside the sleeve and the guide extending from a first side of the disc facing the sleeve but the guide not extending from a second side of the disc opposite the first side, the guide configured to slide against the sleeve in a constant orientation of the disc, wherein an outer diameter of the guide is less than an outer diameter of the disc; and
    a spring positioned inside the guide and configured to press the disc towards the seat, the spring contacting the first side of the disc,
    wherein the disc and seat configured such that the disc when not contacting the seat is in an open position allowing fluid to flow there between and when the disc contacts the seat a seal is formed in a closed position preventing the fluid to flow there between, the disc having full freedom of movement between the open position and the closed position, wherein a surface of the seat is flat and faces the disc and is parallel to a surface of the disc, wherein in the closed position contact is only made on one plane between the surface of the seat and the surface of the disc, wherein the surface of the disc and the surface of the seat are both perpendicular to a direction that the guide extends into the disc.

2. The valve assembly as recited in claim 1, wherein the disc and seat are made of stainless steel.

3. The valve assembly as recited in claim 1, further comprising a control chamber formed inside the sleeve and the guide.

4. The valve assembly as recited in claim 1, wherein the guide is cylindrical.

5. The valve assembly as recited in claim 3, further comprising an aperture in the control chamber on an outlet face side.

6. The valve assembly as recited in claim 3, further comprising an enclosed chamber completely surrounding the control chamber on an outlet face side and an orifice passing between the control chamber and the enclosed chamber.

7. A valve assembly, comprising:
    a seat;
    a disc;
    a guiding means positioned inside a sleeve and extending from a first side of the disc facing the sleeve but not extending from a second side of the disc opposite the first side, the guiding means maintaining a constant orientation of the disc while the disc moves, wherein an outer diameter of the guiding means is less than an outer diameter of the disc; and
    a spring positioned inside the guiding means and configured to press the disc towards the seat, the spring contacting the first side of the disc,
    wherein the disc and seat configured such that the disc when not contacting the seat is in an open position allowing fluid to flow there between and when the disc contacts the seat a seal is formed in a closed position preventing the fluid to flow there between, the disc having full freedom of movement between the open position and the closed position, wherein a surface of the seat is flat and faces the disc and is parallel to a surface of the disc, wherein in the closed position contact is only made on one plane between the surface of the seat and the surface of the disc, wherein the surface of the disc and the surface of the seat are both perpendicular to a direction that the guiding means extends into the disc.

8. The valve assembly as recited in claim 7, wherein the disc and seat are made of stainless steel.

9. A valve assembly, comprising:
- a seat;
- a disc;
- a guiding means extending from a first side of the disc facing a sleeve but not extending from a second side of the disc opposite the first side, the guiding means maintaining a constant orientation of the disc while the disc moves, wherein an outer diameter of the guiding means is less than an outer diameter of the disc; and
- a spring positioned inside the guiding means and configured to press the disc towards the seat, the spring contacting the first side of the disc, wherein the disc and seat configured such that the disc when not contacting the seat is in an open position allowing fluid to flow there between and when the disc contacts the seat a seal is formed in a closed position preventing the fluid to flow there between, the disc having full freedom of movement between the open position and the closed position, wherein a surface of the seat is flat and faces the disc and is parallel to a surface of the disc, wherein in the closed position contact is only made on one plane between the surface of the seat and the surface of the disc, wherein the surface of the disc and the surface of the seat are both perpendicular to a direction that the guiding means extends into the disc; and
- a control chamber formed inside a sleeve and the guiding means.

10. The valve assembly as recited in claim 7, wherein the guiding means is cylindrical.

11. The valve assembly as recited in claim 1, wherein the disc excluding the guide is cylindrical.

12. The valve assembly as recited in claim 7, wherein the disc excluding the guiding means is cylindrical.

13. The valve assembly as recited in claim 9, wherein the guiding means is positioned inside the sleeve.

* * * * *